(12) United States Patent
Iso

(10) Patent No.: US 10,630,141 B2
(45) Date of Patent: Apr. 21, 2020

(54) DRIVING APPARATUS

(71) Applicant: Mitsuba Corporation, Gunma (JP)

(72) Inventor: Yukiyoshi Iso, Gunma (JP)

(73) Assignee: MITSUBA CORPORATION, Gunma (JP)

( * ) Notice: Subject to any disclaimer, the term of this patent is extended or adjusted under 35 U.S.C. 154(b) by 385 days.

(21) Appl. No.: 15/543,640

(22) PCT Filed: Jan. 8, 2016

(86) PCT No.: PCT/JP2016/050536
§ 371 (c)(1),
(2) Date: Jul. 14, 2017

(87) PCT Pub. No.: WO2016/117396
PCT Pub. Date: Jul. 28, 2016

(65) Prior Publication Data
US 2017/0353079 A1 Dec. 7, 2017

(30) Foreign Application Priority Data

Jan. 19, 2015 (JP) .................................. 2015-007698

(51) Int. Cl.
H02K 7/116 (2006.01)
B60S 1/08 (2006.01)
(Continued)

(52) U.S. Cl.
CPC .......... H02K 7/1166 (2013.01); B60S 1/0807 (2013.01); H02K 3/28 (2013.01);
(Continued)

(58) Field of Classification Search
CPC .......... H02K 15/14; H02K 1/185; H02K 5/04; H02K 5/06; H02K 5/15
See application file for complete search history.

(56) References Cited

U.S. PATENT DOCUMENTS

2013/0106219 A1* 5/2013 Schneider ................ H02K 5/16
310/89
2017/0093250 A1* 3/2017 Li ........................... H02K 1/185
(Continued)

FOREIGN PATENT DOCUMENTS

CN 102106065 A 6/2011
JP 2010-93977 A 4/2010
(Continued)

OTHER PUBLICATIONS

Machine translation of Mitsuba JP2014155406 (Year: 2014).*
(Continued)

*Primary Examiner* — Bernard Rojas
(74) *Attorney, Agent, or Firm* — McCormick, Paulding & Huber, PLLC

(57) ABSTRACT

In a driving apparatus (10) in which a position of a rotating shaft (27) of an electric motor (16) in a direction of an axis (B1) is determined, the driving apparatus (10) has: a stopper (77) which determines a position of the rotating shaft (27) in the direction of the axis (B1), and a terminal holder (31) which holds a first terminal for supplying an electric current to the electric motor (16), wherein a layout region of the stopper (77) in the direction of the axis (B1) and a layout region of the terminal holder (31) in the direction of the axis (B1) are overlapped with each other.

6 Claims, 14 Drawing Sheets

(51) Int. Cl.
    *H02K 3/28*    (2006.01)
    *H02K 5/22*    (2006.01)
    *H02K 11/33*   (2016.01)
    *H02K 29/08*   (2006.01)
(52) U.S. Cl.
    CPC ............ *H02K 5/225* (2013.01); *H02K 11/33* (2016.01); *B60S 1/08* (2013.01); *H02K 29/08* (2013.01)

(56) References Cited

U.S. PATENT DOCUMENTS

2017/0203722 A1* 7/2017 Shoda ..................... B60S 1/08
2017/0207684 A1* 7/2017 Amanuma ............... B60S 1/08
2017/0366070 A1* 12/2017 Iso ........................... H02K 3/28

FOREIGN PATENT DOCUMENTS

| JP | 2011-35962 A | 2/2011 |
| JP | 2011-234453 A | 11/2011 |
| JP | 2014-155406 A | 8/2014 |
| WO | 2010024406 A1 | 3/2010 |

OTHER PUBLICATIONS

International Search Report for PCT Serial No. PCT/JP2016/050536 dated Mar. 8, 2016.
Supplementary European Search Report for Serial No. 16 74 0003 dated Sep. 4, 2018.

* cited by examiner

DRIVING APPARATUS

CROSS-REFERENCE TO RELATED APPLICATIONS

This application is a National Stage application of International Patent Application No. PCT/JP2016/050536, filed on Jan. 8, 2016, which claims priority to Japanese Patent Application No. 2015-007698, filed on Jan. 19, 2015, each of which is hereby incorporated by reference in its entirety.

TECHNICAL FIELD

The present invention relates to a driving apparatus in which a position of a rotating shaft of an electric motor in an axis direction is determined.

BACKGROUND ART

Conventionally, a driving apparatus for use in a wiper apparatus of a vehicle has been known and disclosed in Japanese Patent Application Laid-Open Publication No. 2011-234453. The driving apparatus disclosed in Japanese Patent Application Laid-Open Publication No. 2011-234453 comprises: a cylindrical yoke, a gear case to which the yoke is fixed, a cover for covering an opening of the gear case, and an electric motor disposed inside and over the yoke and the gear case. The electric motor comprises: a permanent magnet fixed to an inner surface of the yoke and an armature rotatably installed inside the yoke. The armature is formed by winding an energizing coil around it, and an armature shaft installed in the therein is rotated together with the armature. The armature shaft is disposed inside and over the yoke and the gear case. To the armature shaft, a commutator for energizing the coil is attached.

In the armature shaft, a worm is formed on an outer periphery of a portion disposed inside the gear case. A worm wheel is formed inside the gear case, and a gear formed on the outer periphery of the worm wheel is meshed with the worm. A terminal holder is formed in the gear case, and the terminal connected to the commutator is supported by the terminal holder. A positioning member is attached to the gear case, and the position of the armature shaft is determined in an axis direction by the positioning member.

SUMMARY

However, in the driving apparatus described in Japanese Patent Application Laid-Open Publication No. 2011-234453, the terminal holder and the positioning member are disposed side by side in the axis direction. For this reason, the driving apparatus tends to be increased in size in the axis direction.

An object of the present invention is to provide a driving apparatus capable of being suppressed in size in the axis direction of the rotating shaft.

According to one aspect of the present invention, there is provided a driving apparatus in which a position of a rotating shaft of an electric motor in an axis direction is determined, the driving apparatus comprising: a positioning member which determines a position of the rotating shaft in the axis direction, and a terminal holder which holds a first terminal for supplying an electric current to the electric motor, wherein a layout region of the positioning member in the axis direction and a layout region of the terminal holder in the axis direction are overlapped with each other.

In another aspect of the present invention, the electric motor comprises: a stator having a coil connected to the first terminal; and a rotor attached to the rotating shaft, and forming a rotating magnetic field together with the stator.

In another aspect of the present invention, the driving apparatus further comprises: a gear case in which the rotating shaft is housed; and a bearing disposed inside the gear case, the bearing rotatably supporting the rotating shaft, wherein the positioning member is made in contact with the bearing and the gear case to determine the position of the rotating shaft in the axis direction.

In another aspect of the present invention, the driving apparatus further comprises: a worm formed on the rotating shaft; and a worm wheel rotatably disposed in the gear case, the worm wheel having a worm gear which is meshed with the worm.

In another aspect of the present invention, the driving apparatus further comprises: a cover which covers an opening of the gear case, a control board supported by the cover, the control board having installed thereon electric parts which control the electric motor, and a second terminal attached to the control board and connected to the first terminal.

In another aspect of the present invention, a load receiving mechanism is installed inside the gear case, and receives a load which is applied to the terminal holder when the first terminal and the second terminal are connected to each other.

In another aspect of the present invention, the load receiving mechanism is a mount which protrudes from an inner surface of the gear case.

In another aspect of the present invention, the load receiving mechanism is the positioning member.

In another aspect of the present invention, the second terminal protrudes in the axis direction from an edge of the control board, and a sensor for detecting a rotation phase of the rotating shaft is installed on the control board.

In another aspect of the present invention, the driving apparatus further comprises: an output shaft which is connected to a wiper arm, and rotated with the worm wheel.

In another aspect of the present invention, the electric motor is a brushless motor.

According to the present invention, in the axis direction, since the layout region of the terminal holder and the layout region of the positioning member are overlapped with each other, it is possible to suppress the size of the driving apparatus in the axis direction.

DETAILED DESCRIPTION

Hereinafter, embodiments of the driving apparatus will be described in detail with reference to the drawings.

Figure 1:
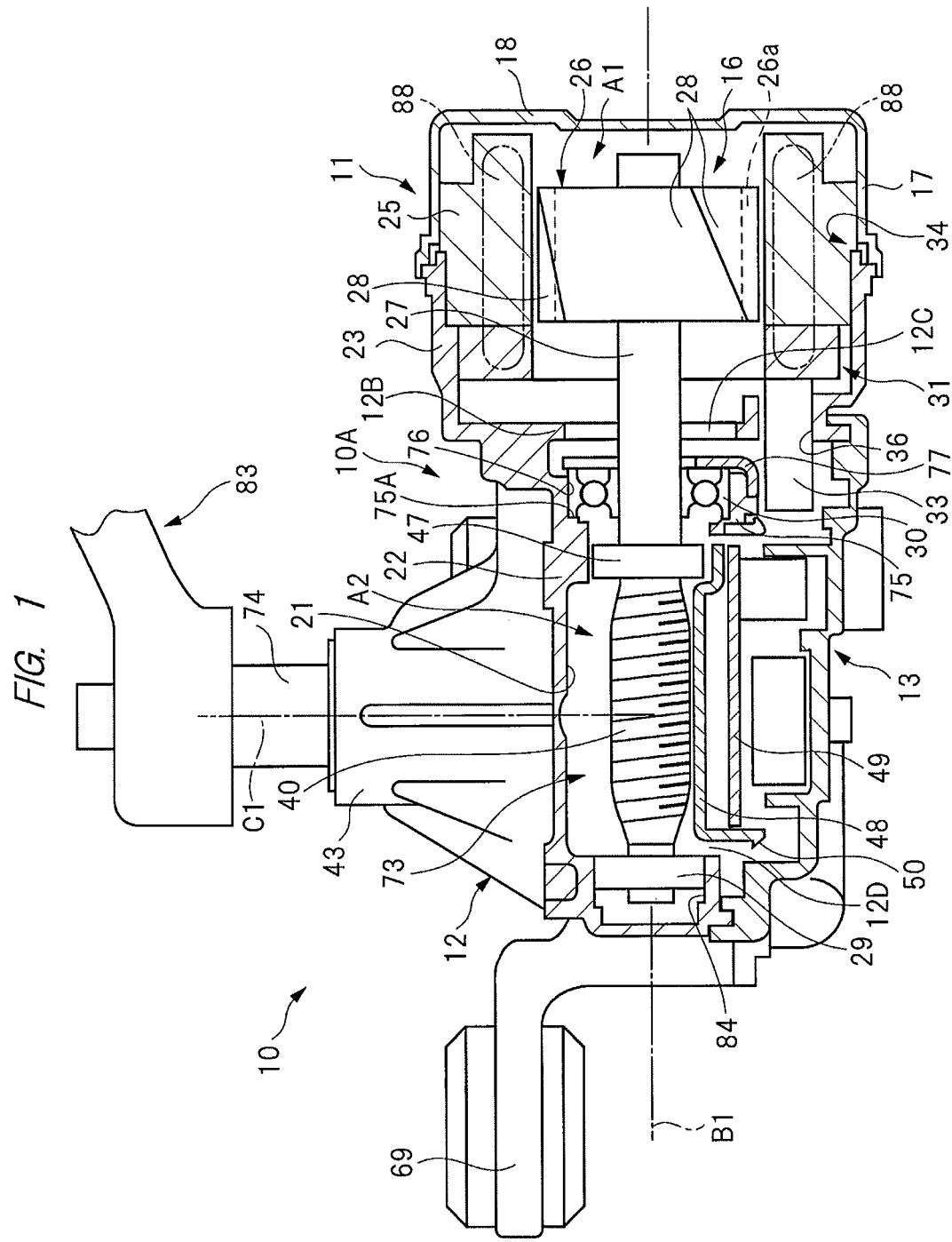
FIG. 1 is a sectional view showing a driving apparatus according to one embodiment.
Figure 2:
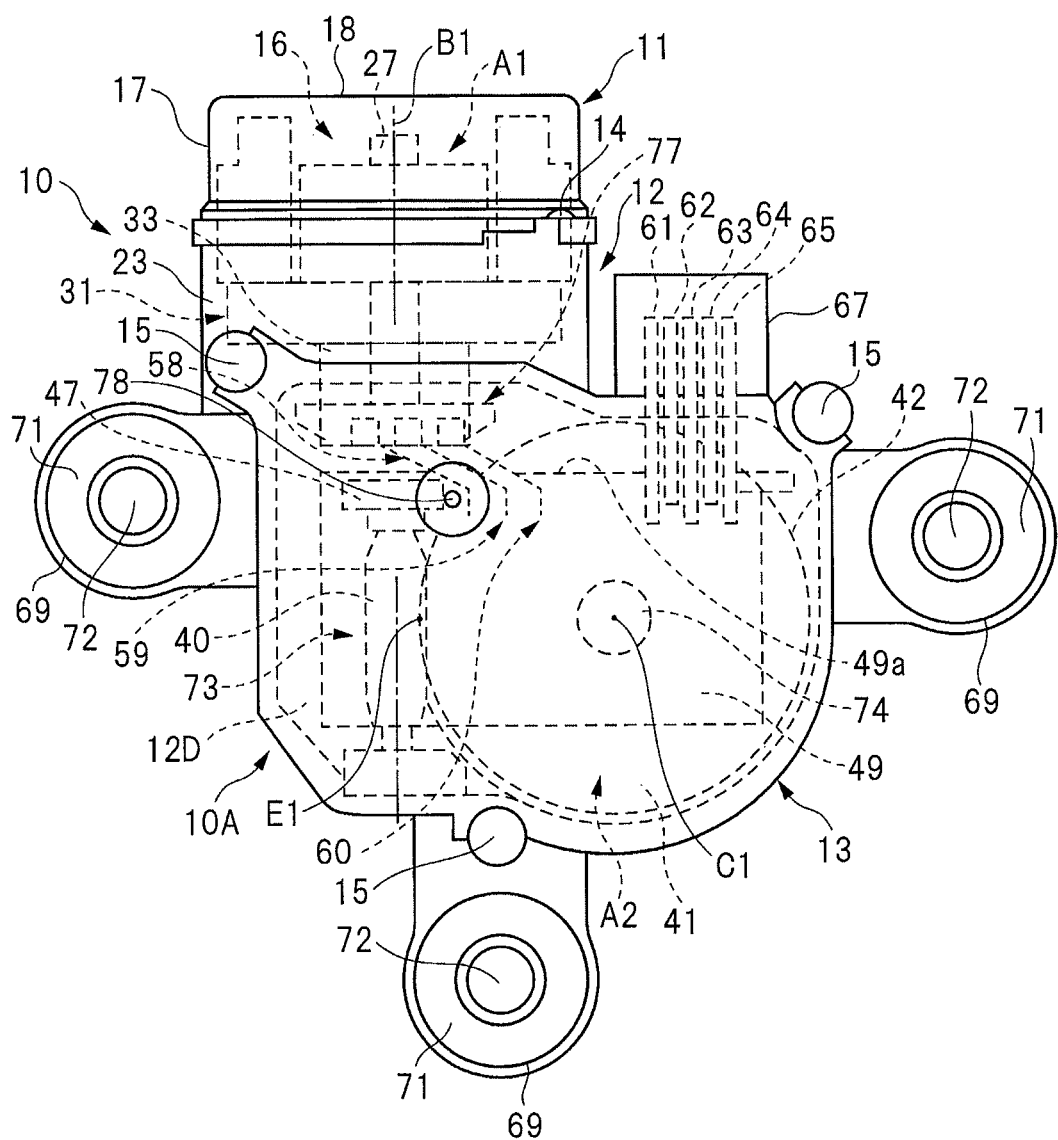
FIG. 2 is a bottom view of the driving apparatus of FIG. 1.
Figure 3:
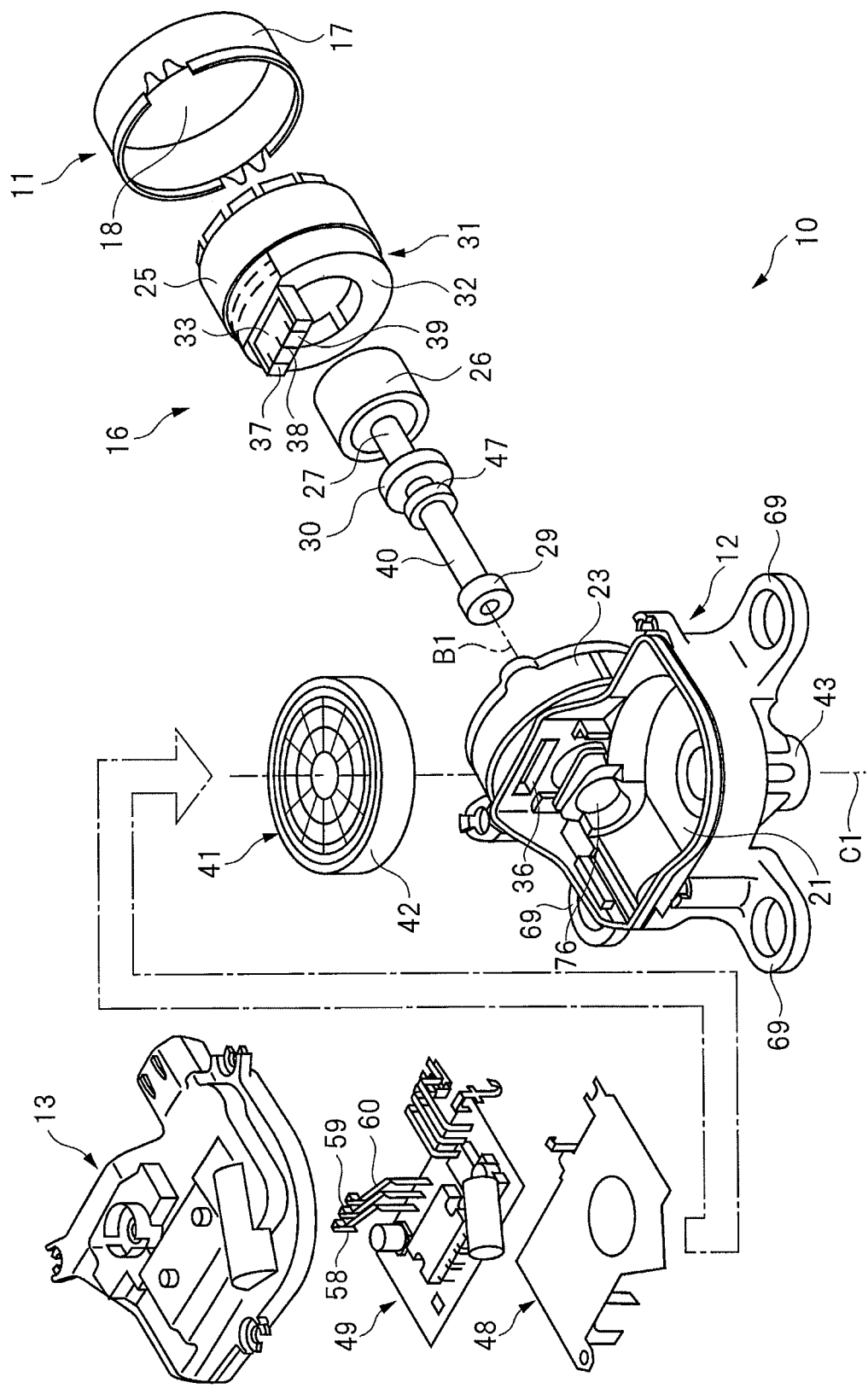
FIG. 3 is an exploded perspective view of the driving apparatus of FIG. 1.

FIGS. 1 and 2 are sectional views each showing a driving apparatus 10 which is in a completely-assembled state, and FIG. 3 is an exploded perspective view of the driving apparatus 10. The driving apparatus 10 includes a casing 10A. The casing 10A has a motor case 11, a gear case 12, and a cover 13. The motor case 11 is fixed to the gear case 12, using a screw 14. The cover 13 is fixed to the gear case 12, using screws 15, and covers an opening 12D of the gear case 12.

The motor case 11 and the gear case 12 form a first housing chamber A1, and the gear case 12 and the cover 13 form a second housing chamber A2. In other words, the first housing chamber A1 and the second housing chamber A2 are formed in the casing 10A. In the gear case 12, a wall 12B is formed so as to partition an inner space into the first housing chamber A1 and the second housing chamber A2. A shaft hole 12C extends in such a way as to penetrate the wall 12B. The first housing chamber A1 and the second housing chamber A2 communicate with each other through the shaft hole 12C.

The driving apparatus 10 includes an electric motor 16 and a speed-reducing mechanism 73. The electric motor 16 is disposed in the first housing chamber A1. The speed-reducing mechanism 73 is disposed in the second housing chamber A2.

The motor case 11 includes a cylindrical portion 17 and a wall 18 closing a first end of the cylindrical portion 17, the first end being one end in a direction along an axis B1. The motor case 11 is molded integrally out of insulating material such as synthetic resin. The material of the motor case 11 is not limited to the synthetic resin. Other materials, such as iron, may be used to make the motor case 11 such that an iron sheet is stamped by a press machine to form the motor case 11. An opening 34 is formed on a second end of the cylindrical portion 17. The gear case 12 includes a body 22 having a recession 21, and a cylindrical connecting portion 23 continuous with the body 22. The connecting portion 23 is fixed to the cylindrical portion 17, using a screw 14. The gear case 12 is integrally molded out of conductive material such as iron and aluminum. The wall 12B is formed on the inner surface of the connecting portion 23 along its entire circumference.

The electric motor 16 has a stator 25 and a rotor 26. The stator 25 is disposed in the first housing chamber A1, and does not rotate relative to the motor case 11 and the gear case 12. The stator 25 has a stator core and a plurality of coils 88 wound around the stator core. The coils 88 include three coils, i.e., "U-phase coil", "V-phase coil", and "W-phase coil".

The rotor 26 has a rotor core 26a and a permanent magnet 28 fixed to the outer periphery of the rotor core 26a. The rotor 26 is disposed in such a way as to extend from the housing chamber A1 to the housing chamber A2. A rotating shaft 27 is disposed in such a way as to extend from the housing chamber A1 to the housing chamber A2, and fitted with two bearings, i.e., bearings 29 and 30 which rotatably support the rotating shaft 27. The rotating shaft 27 is fitted in an inner ring of the bearing 30, and the bearing 30 is fixed to the rotating shaft 27 in a direction of an axis B1. The rotor 26 is fixed to the outer periphery of the rotating shaft 27. The rotor core 26a and the rotating shaft 27 are integrally rotated around the axis B1.

Figure 4:
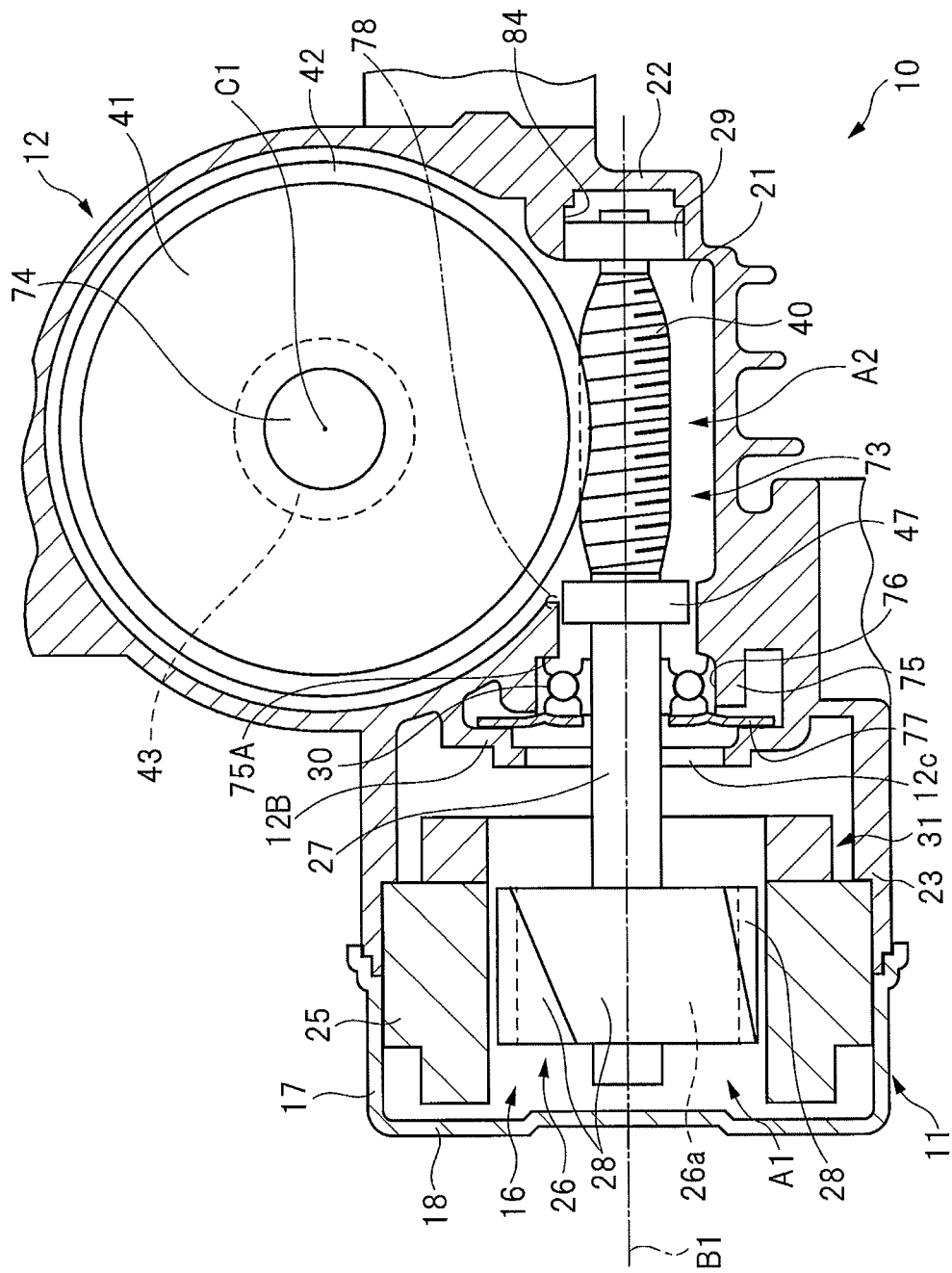
FIG. 4 is a sectional view of the driving apparatus of FIG. 1.

As shown in FIGS. 1 and 4, a bearing support portion 75 protruding from the bottom of the gear case 12 is installed, and the bearing support portion 75 has a bearing support hole 76. The bearing support hole 76 is formed centered on the axis B1, and the bearing 30 is disposed inside the bearing support hole 76. The bearing support hole 76 is connected to the first housing chamber A1 through the shaft hole 12C, and also connected to the second housing chamber A2. Furthermore, a bearing support hole 84 is formed inside the second housing chamber A2 of the gear case 12. The bearing support hole 84 is disposed and coaxially aligned with the bearing support hole 76. The bearing 29 is disposed in the bearing support hole 84. In this manner, both the two bearings 29 and 30 are held by the gear case 12.

A stopper 77 is installed between the bearing support portion 75 and the wall portion 12B, and the position of the stopper 77 is determined in the direction of the axis B1. Furthermore, an annular end face 75A is formed on the inner peripheral portion of the bearing support portion 75, and perpendicular to the axis B1.

Figure 8:
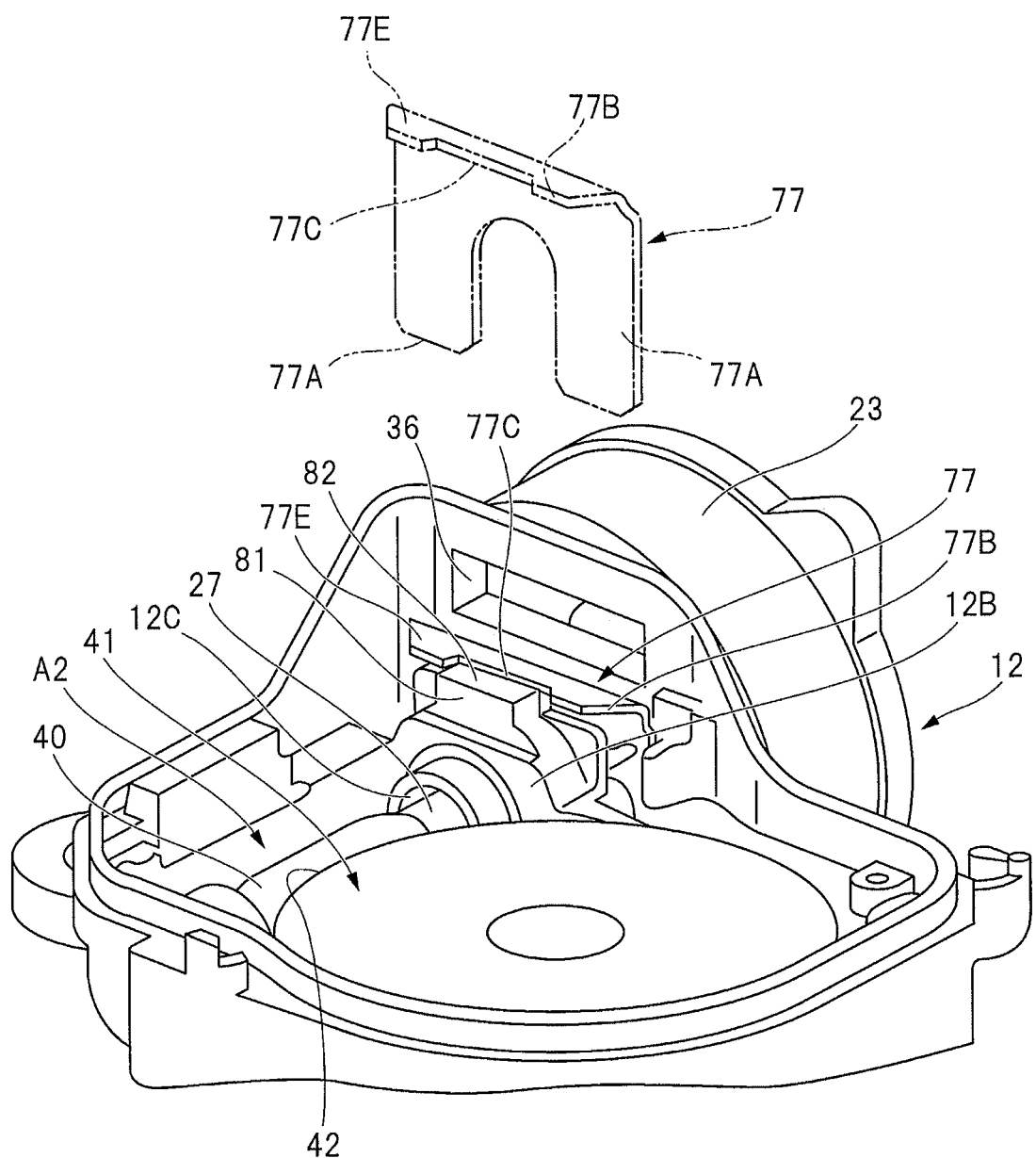
FIG. 8 is a perspective view of the gear case and a stopper, which are used in the driving apparatus of FIG. 1.

The stopper 77 is formed by press working on a metal material, and as shown in FIG. 8, the stopper 77 is formed into an arch shape having two leg portions 77A. The stopper 77 is provided with a plate portion 77B bent relative to the two leg portions 77A. Furthermore, the plate portion 77B has a cut-out portion 77C.

The bearing 30 is disposed between the stopper 77 and the end face 75A in the direction of the axis B1. The stopper 77 and the end face 75A determine the position of the rotating shaft 27 in the direction of the axis B1 relative to the gear case 12 together with the bearing 30. Each surface of two leg portions 77A of the stopper 77 has a concavo/convex shape in the direction of the axis B1. The stopper 77 is pressed onto the bearing 30 and the wall portion 12B by an elastic force of the stopper 77. One portion of the rotating shaft 27 in a length direction thereof is disposed in the shaft hole 12c.

Furthermore, as shown in FIG. 8, a mount 82 protruding outward in the radial direction from the outer periphery of the bearing support portion 75 is formed, and a flat seat surface is formed on a tip end of the mount 82. One portion of the mount 82 is disposed so as to extend along the shape of the cut-out portion 77C. The seat surface of the mount 82 is placed at the same position as that of the surface 77E of the plate portion 77B in a direction of an axis C1.

In the rotating shaft 27, a worm 40 is fitted to an outer periphery of a portion which is disposed in a recessed portion 21 of the gear case 12, or a portion which is housed in the second housing chamber A2. A permanent magnet 47 is fitted to the outer periphery of the portion disposed in a recessed portion 21 of the gear case 12, in the rotating shaft 27. The permanent magnet 47 is used as a sensor magnet, and has magnetic poles alternately arranged in a rotation direction of the rotating shaft 27.

Furthermore, as shown in FIGS. 3 and 4, a worm wheel 41 is disposed in the recession 21, and a worm gear 42 formed on the outer periphery of the worm wheel 41 is engaged with the worm 40. An output shaft 74 is provided and rotated together with the worm wheel 41. A cylindrical portion 43 is provided and continuous with the gear case 12, and the output shaft 74 is rotatably fitted in the cylindrical portion 43. A wiper arm 83 coupled to a portion which is disposed outside of the gear case 12, in the output shaft 74.

In FIG. 1 which is a front view of the driving apparatus 10, seen in a direction parallel with the axis B1, the rotating shaft 27 is disposed between the cover 13 and the cylindrical portion 43. The output shaft 74 extends from the second housing chamber A2 to come out of the casing 10A. As shown in FIG. 4, the worm 40 and the worm gear 42 collectively constitute the speed-reducing mechanism 73. An axis C1 is a rotation center of the output shaft 74, and does not intersect with the axis B1. In FIG. 1 which is a front view of the driving apparatus 10, seen in the direction parallel with the axis B1, the axis B1 and axis C1 are at right angles with each other.

Figure 6:
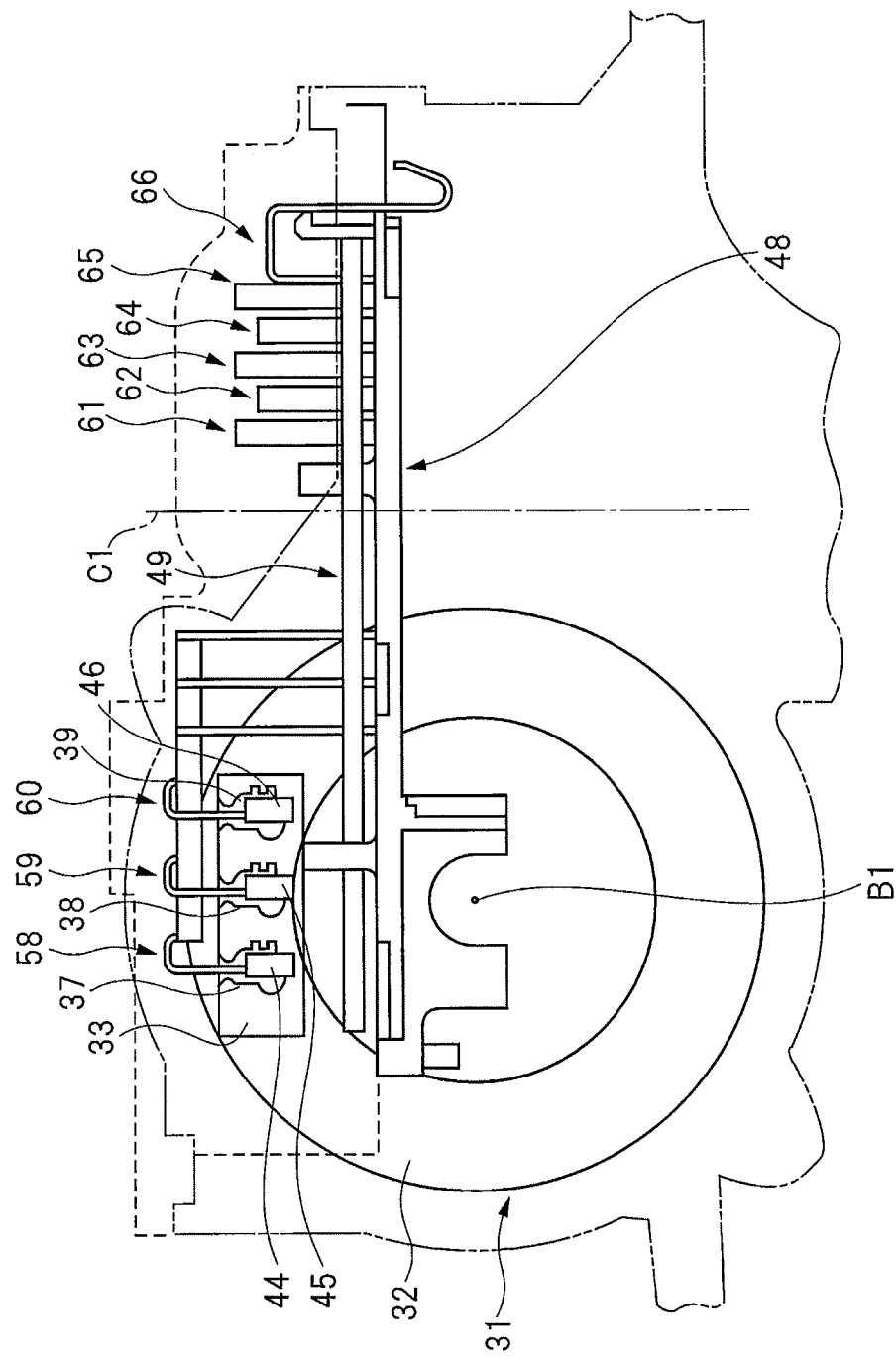
FIG. 6 is a schematic side view of a control board and a board cover, which are used in the driving apparatus of FIG. 1.

On the other hand, as shown in FIGS. 1 to 3, a terminal holder 31 is disposed in the connecting portion 23. The terminal holder 31 is integrally molded out of synthetic resin, and has a cylindrical portion 32 and a projecting portion 33 formed on a part of the cylindrical portion 32 in its circumferential direction. As shown in FIG. 6, in a plan view perpendicular to the axis B1, the projecting portion 33 is rectangular.

Figure 7:
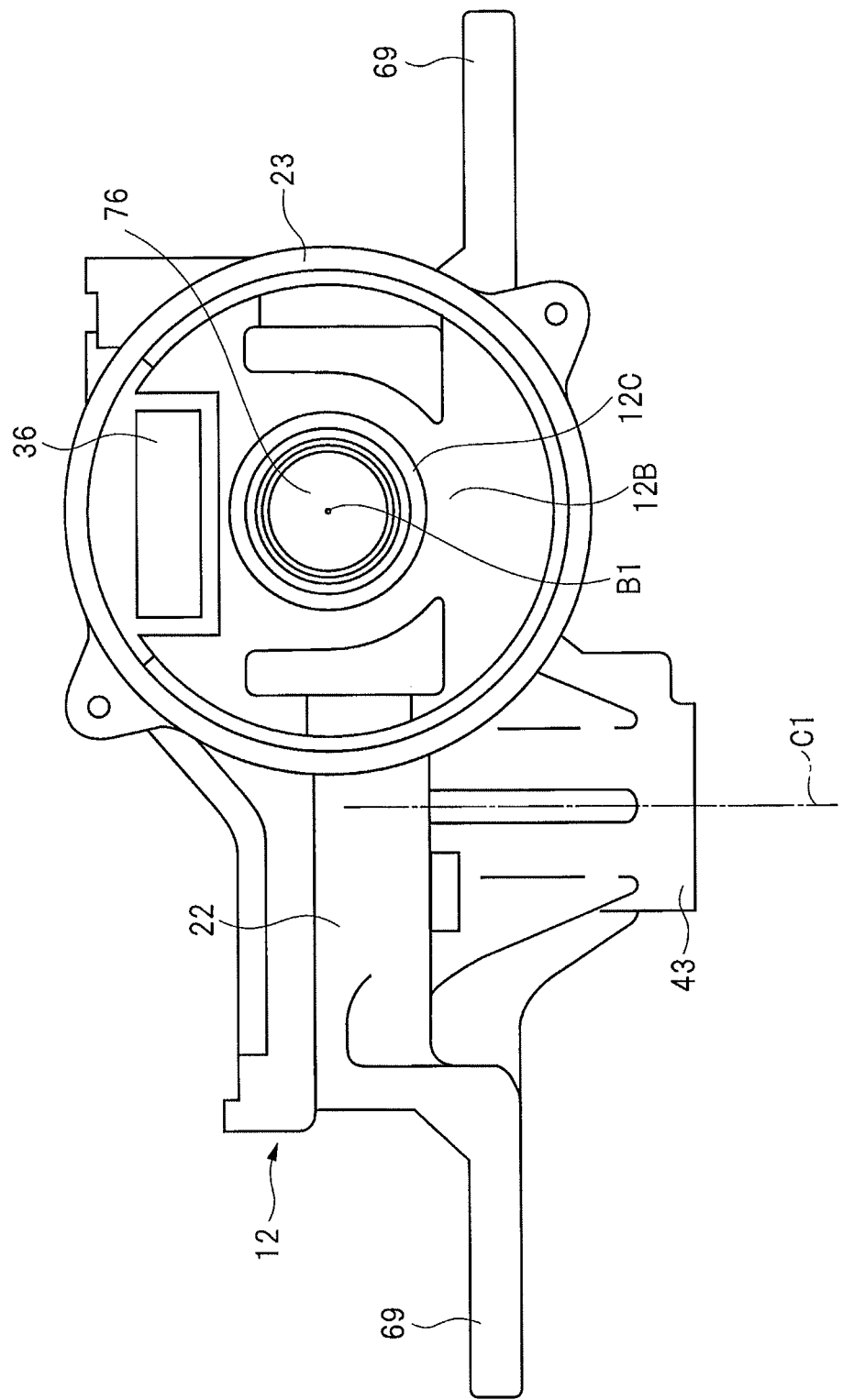
FIG. 7 is a side view of a gear case which is used in the driving apparatus of FIG. 1.

As shown in FIGS. 1 and 7, a through-hole 36 extends so as to penetrate the wall 12B, and the first housing chamber A1 communicates with the second housing chamber A2 through the through-hole 36. In a plan view perpendicular to the axis B1, the through-hole 36 is disposed radially outside the shaft hole 12C. With the terminal holder 31 housed in the connecting portion 23, the projecting portion 33 projects into the second housing chamber A2 through the through-hole 36, as shown in FIG. 1.

As shown in FIG. 2, the layout region of the stopper 77 in the direction of the axis B1 and the layout region of the protruding portion 33 in the direction of the axis B1 are overlapped with each other in a plan view in the assembled state of the driving apparatus 10. The protruding portion 33 is disposed between the stopper 77 and the cover 13 in the direction of the axis C1. Specifically, the stopper 77 and the protruding portion 33 are disposed so as to be overlapped with each other in the axis direction of the output shaft 74. Furthermore, at portions disposed inside the second housing chamber A2 of the protruding portion 33, terminal holding grooves 37, 38 and 39 are formed as shown in FIG. 6. Each of the terminal holding grooves 37, 38 and 39 has a shape formed by cutting out the protruding portion 33 in a direction along the axis C1.

Furthermore, a terminal 44 is provided in the terminal holding slot 37, a terminal 45 is provided in the terminal holding slot 38, and a terminal 46 is provided in the terminal holding slot 39. The terminals 44, 45, and 46 are respectively connected to three coils 88, that is, the U-phase coil, V-phase coil, and W-phase coil. In other words, the terminals 44, 45, and 46 are arranged in the second housing chamber A2.

Figure 5:
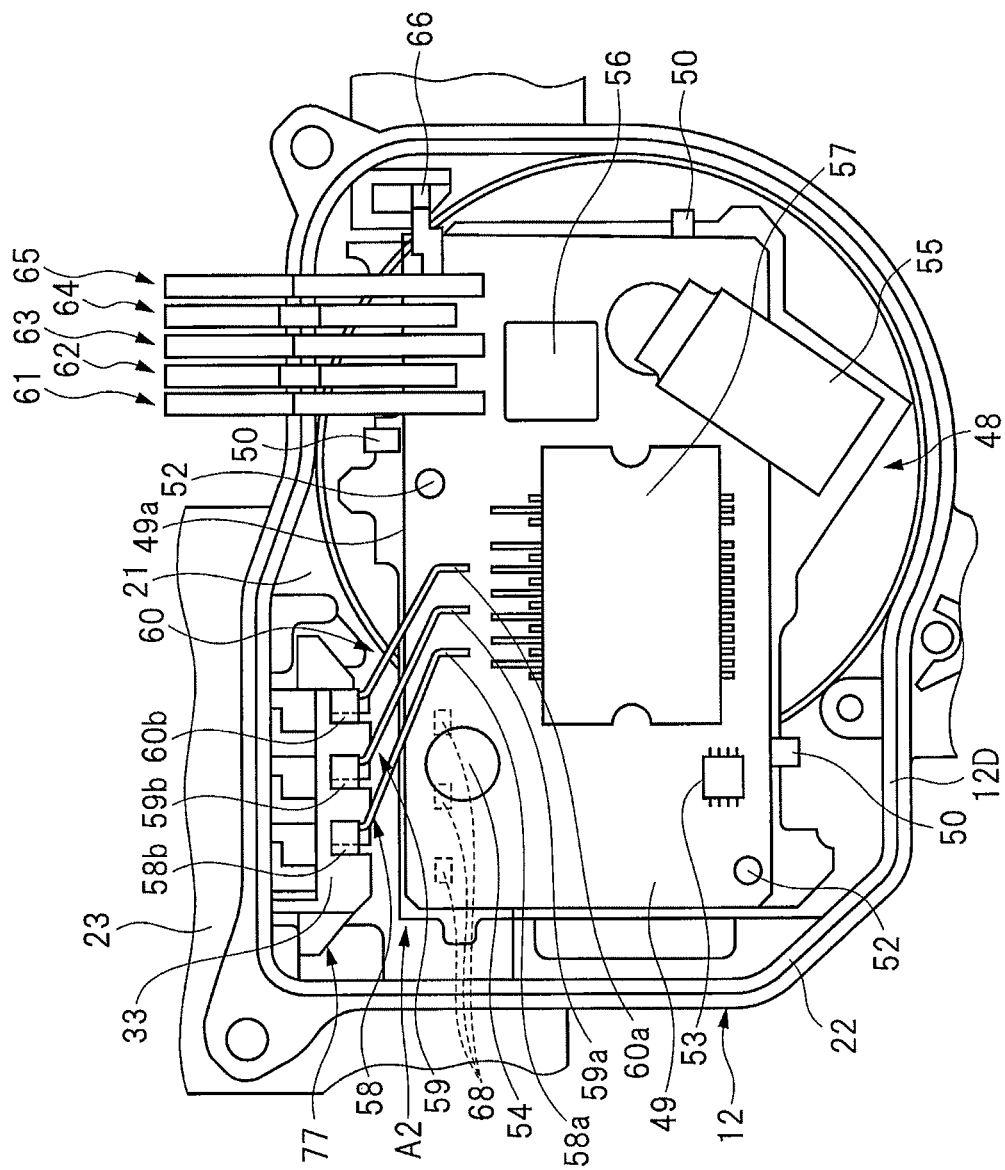
FIG. 5 is a bottom view of the driving apparatus of FIG. 1 with a cover detached from it.

As shown in FIGS. 1 and 5, a board cover 48 and a control board 49 are disposed in the second housing chamber A2. The board cover 48 is integrally molded of insulating material such as synthetic resin, into a plate-like shape. The board cover 48 has a plurality of locking claws 50. The cover 13 has a plurality of locking portions formed on its inner surface. The locking claws 50 are respectively locked onto the locking portions. This fixes the board cover 48 to the cover 13.

The control board 49 is disposed between the cover 13 and the board cover 48 in a direction along the axis C1. In FIGS. 2 and 5 which are bottom views of the driving apparatus 10, the control board 49 is substantially rectangular. The control board 49 is positioned and fixed to the cover 13, using a plurality of positioning screws 52. This sets the control board 49 at right angles with the axis C1, as shown in FIG. 6.

The control board 49 is molded out of insulating material, and carries an electric circuit as well as various electric components. The electric components mounted on the control board 49 include a controller chip 53, capacitors 54 and 55, an inductor 56, an inverter chip 57 having a plurality of switching elements, terminals 58, 59, and 60, terminals 61 to 65, a ground terminal 66, and three magnetic sensors 68. The three magnetic sensors 68 are Hall ICs, and disposed along an edge 49a of the control board 49. The edge 49a extends in a direction substantially perpendicular to the axis B1, when seen in the bottom view of the gear case 12. The layout region of the three magnetic sensors 68 is overlapped with the layout region of the permanent magnet 47. The three magnetic sensors 68 detect the intensity of the magnetic field and switching of the magnetic field formed by the permanent magnet 47, and output electric signals.

Figure 9:
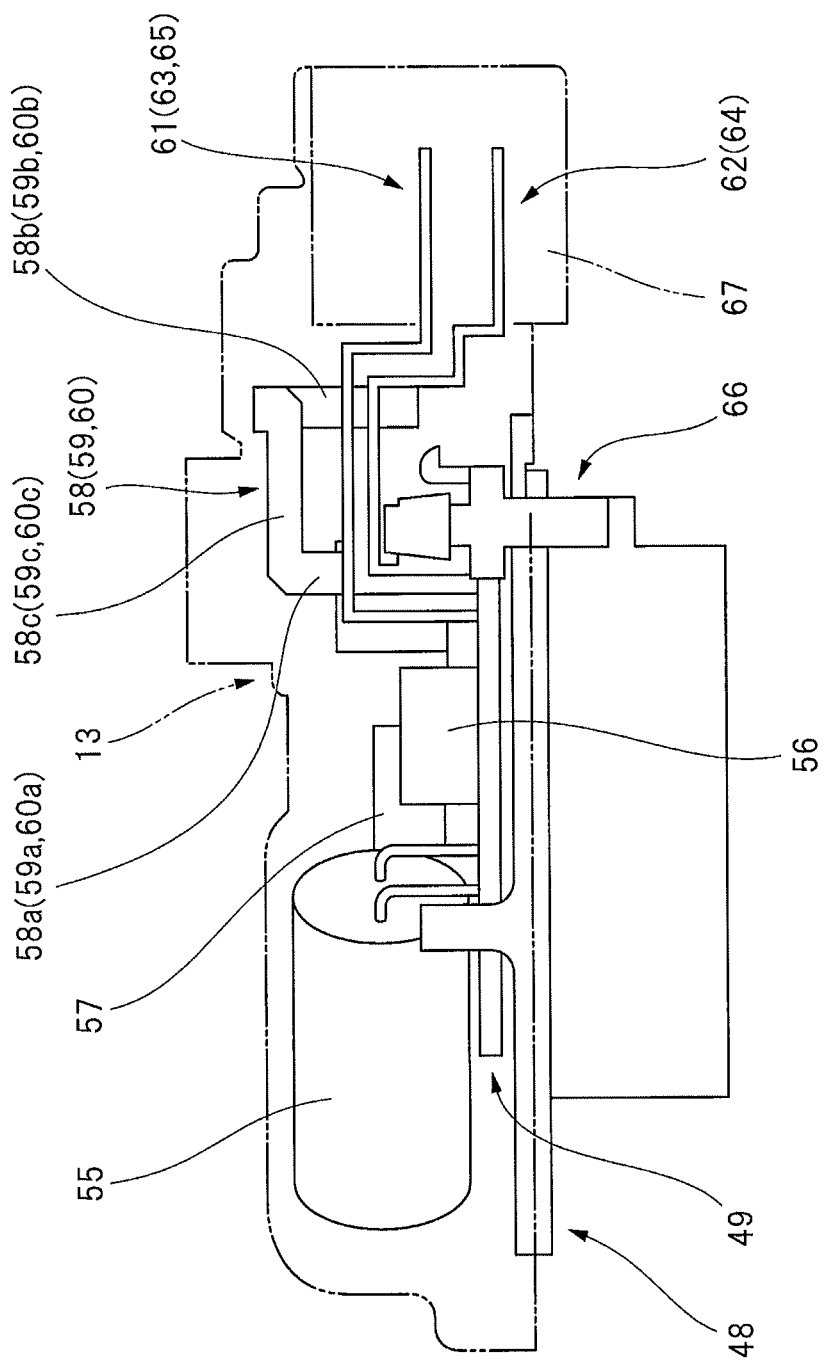
FIG. 9 is a view schematically showing a cover used in the driving apparatus of FIG. 1, and the control board supported by the cover.

As shown in FIG. 2, the cover 13 has a connector 67. First ends of the terminals 61 to 65 are disposed in the connector 67, and second ends of the terminals 61 to 65 are connected to the electric circuit of the control board 49. As shown in FIGS. 5, 6, and 9, a socket for a power cord connected to an external power supply is connected to the connector 67. The ground terminal 66 connects the electric circuit to the gear case 12. The terminals 58, 59, and 60 are each integrally molded out of conductive material. The terminal 58 has leg portions 58a and 58b and a connecting portion 58c connecting the leg portion 58a to the leg portion 58b. The leg portion 58a has an end fixed to the control board 49, and an end (the other end) connected to the connecting portion 58c.

The terminal 59 has leg portions 59a and 59b and a connecting portion 59c connecting the leg portion 59a to the leg portion 59b. The leg portion 59a has an end fixed to the control board 49, and an end (the other end) connected to the connecting portion 59c. The terminal 60 has leg portions 60a and 60b and a connecting portion 60c connecting the leg portion 60a to the leg portion 60b. The leg portion 60a has an end fixed to the control board 49, and an end (the other end) connected to the connecting portion 60c. All of the leg portions 58a, 58b, 59a, 59b, 60a, and 60b extend in a thickness direction of the control board 49, that is, extend in a direction along the axis C1.

Furthermore, in FIGS. 5 and 6 each of which is a bottom view of the gear case 12, the leg portions 58b, 59b, and 60b are disposed outside the edge 49a of the control board 49. The leg portion 58b of the terminal 58 is disposed in the terminal holding slot 37, and connected to the terminal 44 provided to the projecting portion 33. The leg portion 59b of the terminal 59 is disposed in the terminal holding slot 38, and connected to the terminal 45 provided to the projecting portion 33. The leg portion 60b of the terminal 60 is disposed in the terminal holding slot 39 and is connected to the terminal 46 provided to the projecting portion 33.

As shown in FIG. 2, the gear case 12 has a plurality of mounts 69 overhanging from its outer periphery, and annular bushes 71 are fitted in respective holes of the mounts 69. The bush 71 is integrally molded out of rubber-like elastic material. Each bush 71 has a hole 72 in which a screw is screwed, thereby mounting the driving apparatus 10 to a vehicle body frame or a bracket.

Next, operations and controls of the driving apparatus 10 will be described in detail. Power of an external power supply is supplied to the electric circuits of the control board 49 through the terminals 61 to 65. Furthermore, electric power is supplied from the external power supply, so that currents flow through the three coils 88 through the terminals 58, 59 and 60 as well as the terminals 44, 45 and 46. The switching elements of the inverter chip 57 are switched ON/OFF so that currents successively flow through the three coils 88 to form a rotating magnetic field, thereby allowing the rotor 26 to integrally rotate. The controller chip 53 detects the actual rotation phase and the actual rotation speed of the rotating shaft 27 by signals from the magnetic sensors 68, and by controlling the ON/OF timing and the ON ratio of the switching elements, it controls a target rotation number and a target rotation speed of the rotor 26.

In this manner, the electric motor 16 has a configuration for allowing electric currents to flow through the coils 88 of the stator 25, a rotating magnetic field is formed by cooperative functions between the rotor core 26a and the permanent magnet 28. The electric motor 16 is not provided with energizing brushes and a commutator with which the brushes are made in contact. That is, the electric motor 16 is a brushless motor. A torque of the rotating shaft 27 is transmitted to the worm wheel 41 through the worm 40 so that the output shaft 74 rotates and the wiper arm 83 is operated.

As shown in FIG. 2, when seen in a plan view showing an assembled state of the driving apparatus 10, a layout in which the layout region of the stopper 77 and the layout region of the protruding portion 33 are overlapped with each other, is adopted by the axis direction of the rotating shaft 27 corresponding to the direction of the axis B1 and the output shaft 74 corresponding to the direction of the axis C1. For this reason, it is not necessary to have an exclusively used space for the connections between the terminals 44 to 46 and the terminals 58 to 60. Therefore, it is possible to suppress the size of the driving apparatus 10 in the direction of the axis B1. In other words, it is possible to reduce a total length of the driving apparatus 10 in the axis direction of the rotating shaft 27 corresponding to the direction of the axis B1, thereby reducing the size of the driving apparatus 10.

Furthermore, since the layout region of the stopper 77 and the layout region of the protruding portion 33 are overlapped with each other in the axis direction of the rotating shaft 27 corresponding to the direction of the axis B1, the amount of each protrusion of the terminals 58, 59 and 60 from the edge 49a of the control board 49 in the axis direction of the rotating shaft 27 corresponding to the direction of the axis B1 can be reduced as much as possible.

Figure 10:
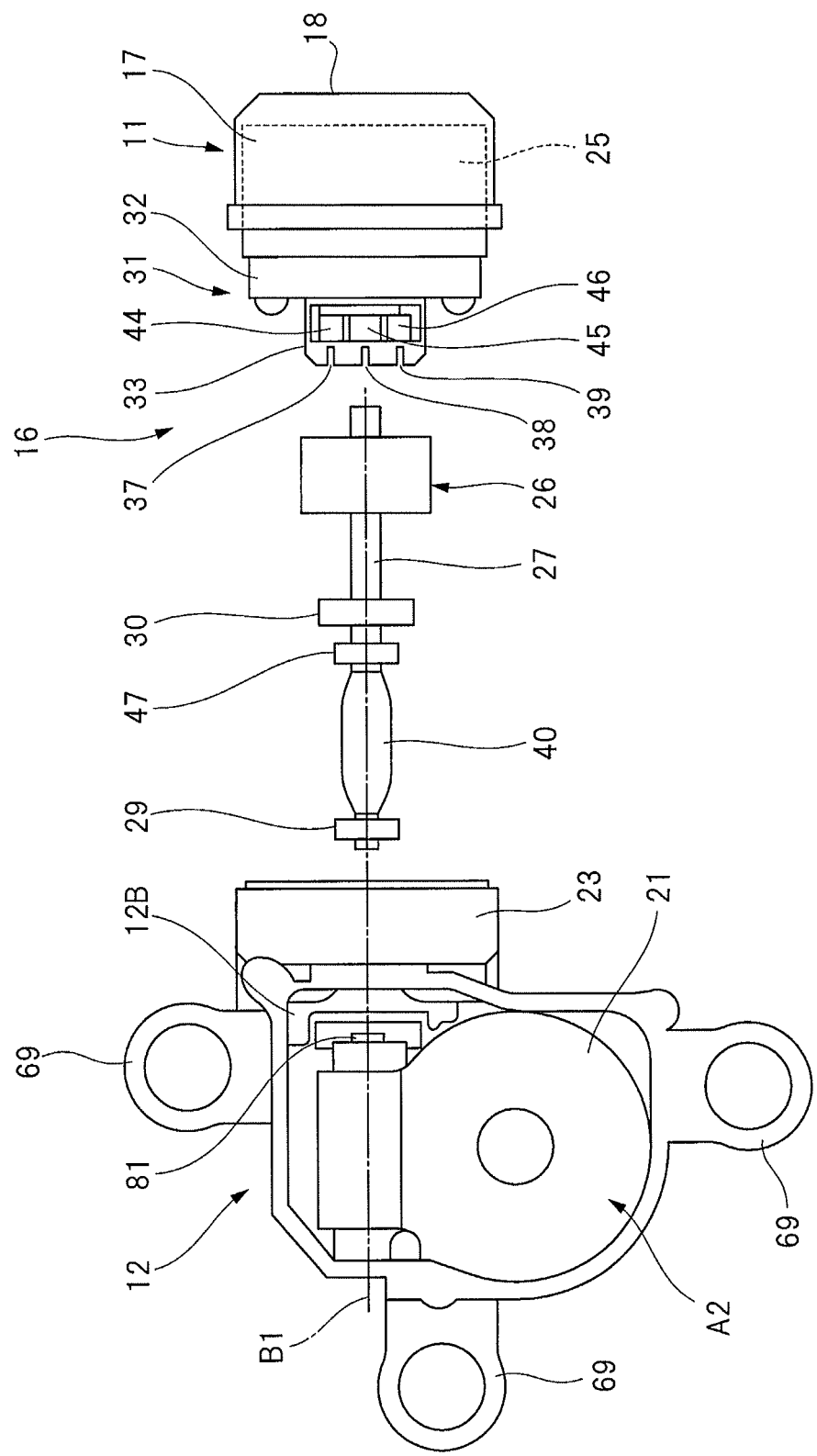
FIG. 10 is a bottom view showing an assembling process of the driving apparatus of FIG. 1.
Figure 11:
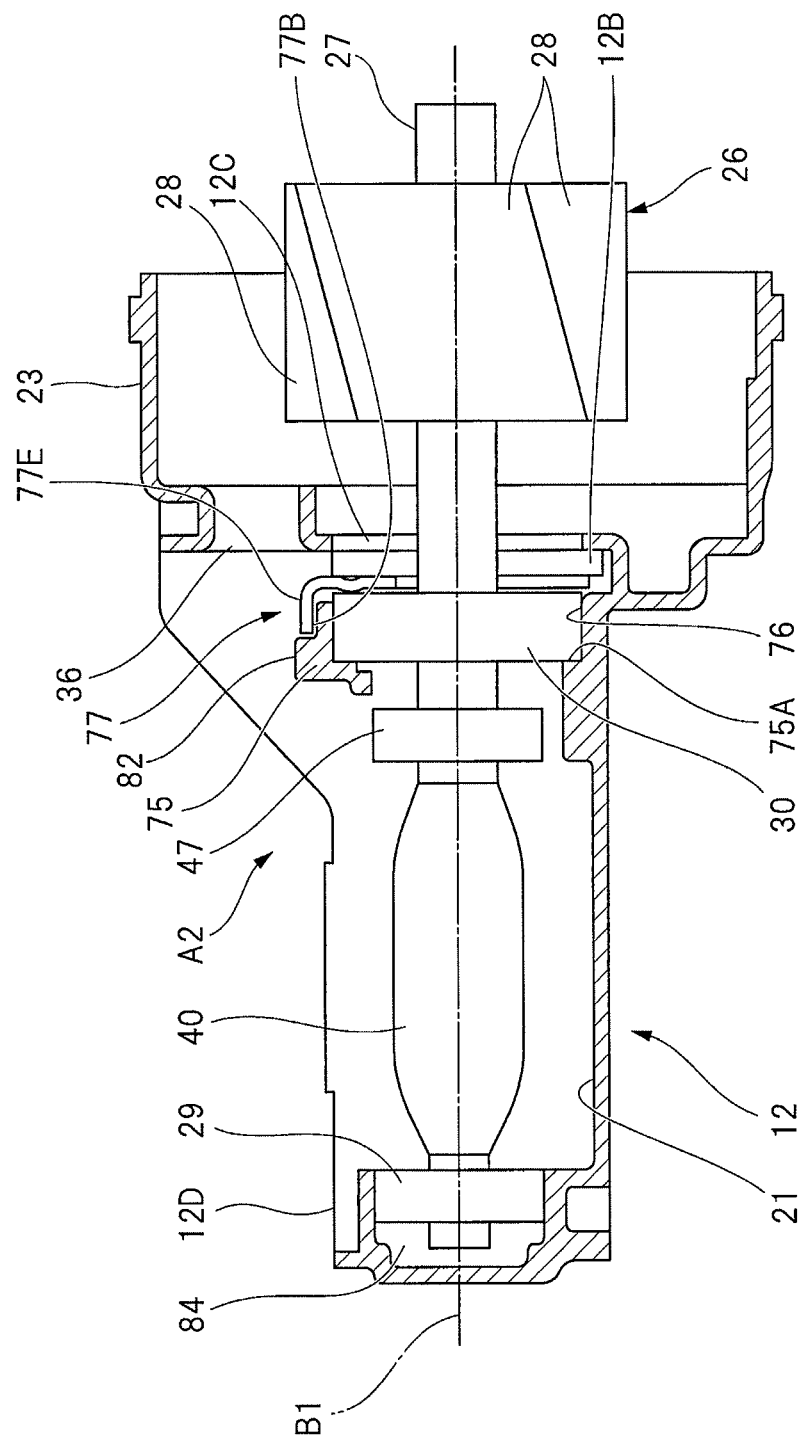
FIG. 11 is a side sectional view of the assembling process of the driving apparatus of FIG. 1.

Next, an assembling method for the driving apparatus 10 will be described in detail. First, as shown in FIG. 10, the worker determines positions of the rotor 26 and the gear case 12 relative to each other, and parallely moves the rotating shaft 27 in an approaching direction to the gear case 12. Then, as shown in FIG. 11, the rotating shaft 27 is inserted into the bearing support hole 76, with the bearing 29 being disposed in a bearing support hole 84, and the bearing 30 is made in contact with the end face 75A, thereby stopping the movement of the rotating shaft 27.

After completion of the parallel movement of the rotor 26 into the gear case 12, the stopper 77 is inserted between the bearing support portion 75 of the gear case 12 and the wall portion 12B, and the position of the rotor 26 is determined relative to the gear case 12 in the axis direction of the rotating shaft 27 corresponding to the direction of the axis B1. The two leg portions 77A of the stopper 77 are disposed so as to across and straddle the rotating shaft 27. Then, the worm wheel 41 is disposed in the concave portion 21 of the gear case 12 so that the worm gear 42 and the worm 40 are meshed with each other.

Figure 12:
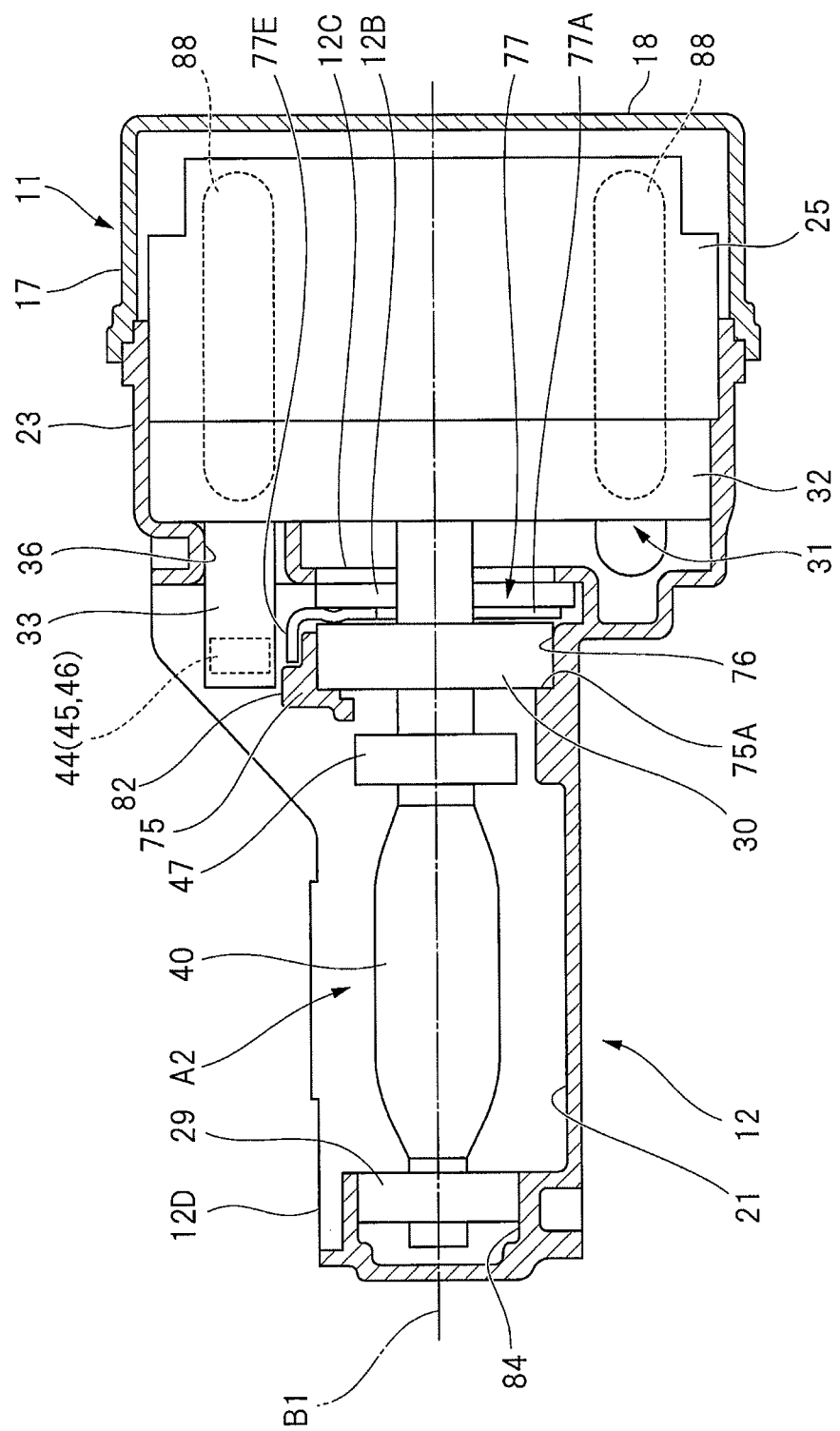
FIG. 12 is a side sectional view of the assembling process of the driving apparatus of FIG. 1.

Next, the terminal holder 31 is inserted into the connection portion 23, and the protruding portion 33 is also inserted into the through hole 36. Furthermore, the cylindrical portion 32 of the terminal holder 31 is allowed to proceed into the connection portion 23 so that as shown in FIG. 12, the terminal holder 31 is stopped relative to the gear case 12. Then, the stator 25 is covered with the motor case 11, and by tightening the screw member 14, the motor case 11 and the gear case 12 are fixed to each other. Additionally, the terminal holder 31 and the motor case 11 may be simultaneously brought closer to the gear case 12.

Figure 14:
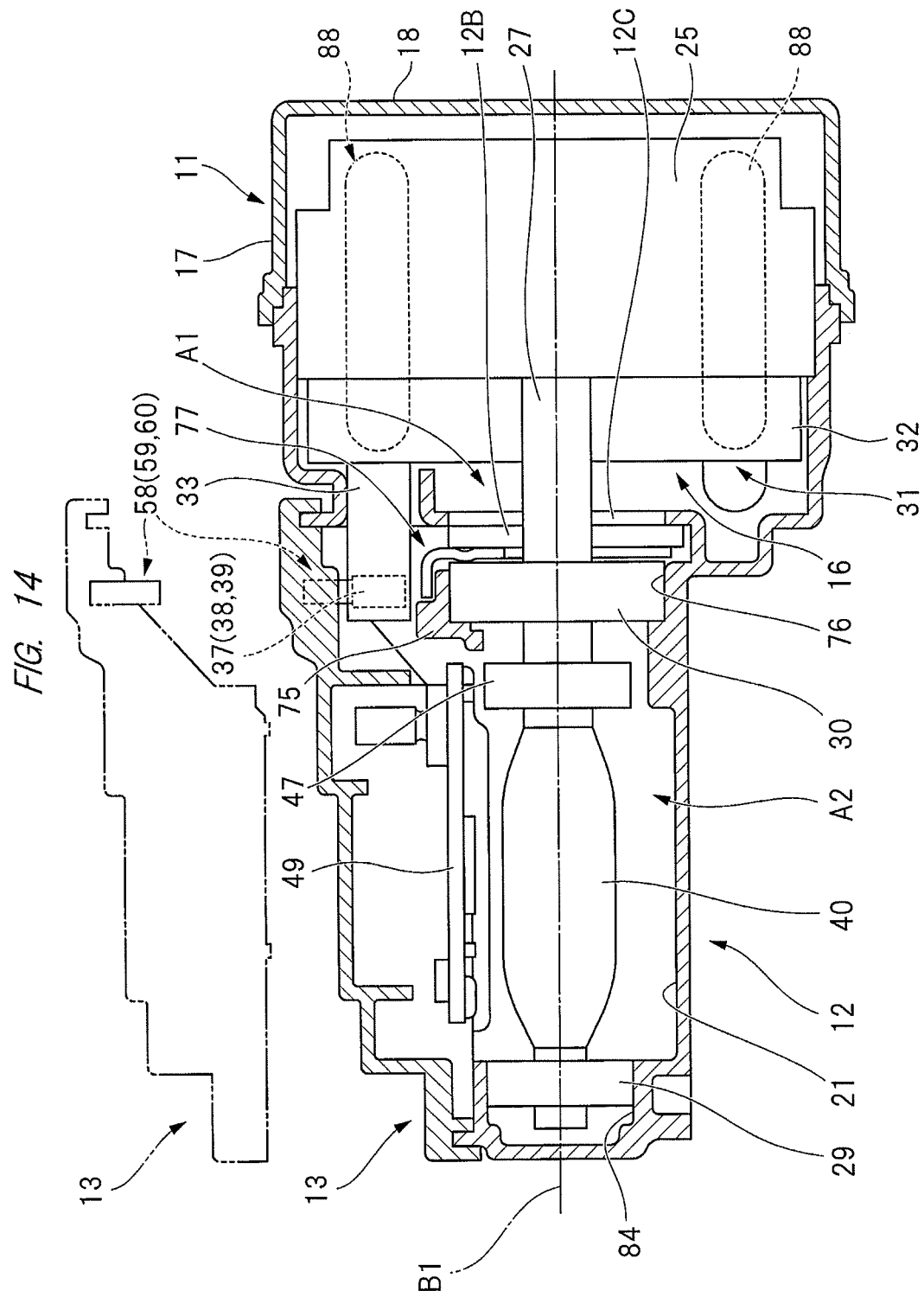
FIG. 14 is a side sectional view of the assembling process of the driving apparatus of FIG. 1.

Furthermore, the cover 13, to which the substrate cover 48 and the control board 49 are attached, and the gear case 12 are made closer to each other in the axis direction of the output shaft 74, which corresponds to a direction along the axis C1. In this case, the leg portion 58b of the terminal 58 is allowed to proceed to the terminal holding groove 37 so that the leg portion 58b is connected to the terminal 44. In the same manner, the leg portion 59b of the terminal 59 is allowed to proceed to the terminal holding groove 38 so that the leg portion 59b is connected to the terminal 45, and the leg portion 60b of the terminal 60 is allowed to proceed to the terminal holding groove 39 so that the leg portion 60b is connected to the terminal 46. Furthermore, as shown in FIG. 14, after the cover 13 and the gear case 12 have been made in contact with each other, the screw member 15 is tightened so that the gear case 12 and the cover 13 are fixed to each other, thereby completing assembling operations of the driving apparatus 10.

In the above-mentioned assembling processes of the driving apparatus 10, when the terminals 58, 59 and 60 and the terminals 44, 45 and 46 are mutually connected to each other, the protruding portion 33 receives a pressing load or a press-inserting load. In this case, the seat surface of the mount 82 and the surface 77E are disposed at the same positions as each other in the axis direction of the output shaft 74, which corresponds to the direction of the axis C1, the load received by the protruding portion 33 is transmitted to the mount 82 and the stopper 77.

Figure 13:
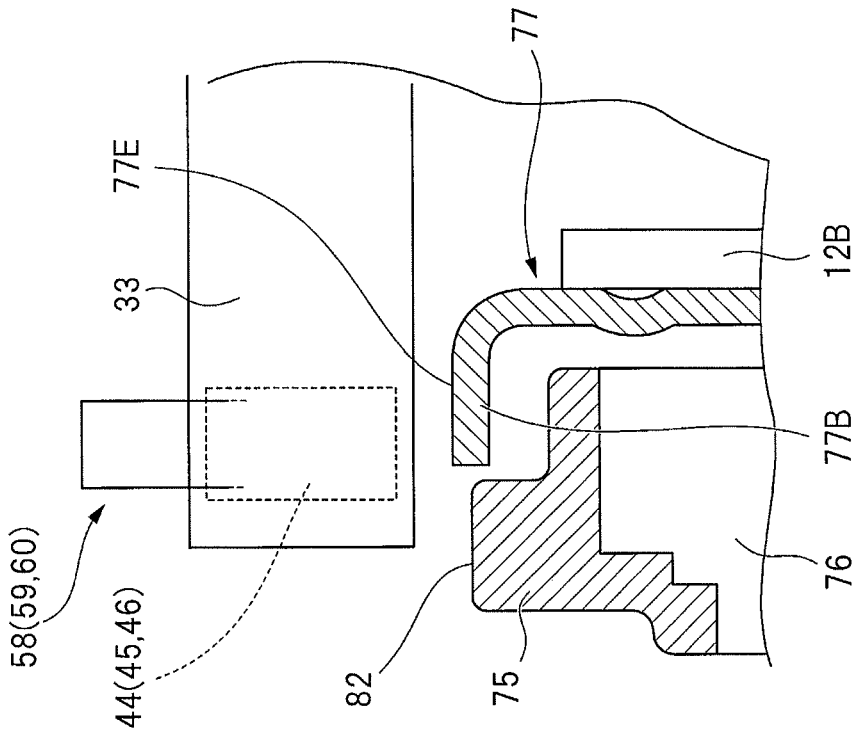
FIGS. 13A and 13B are enlarged sectional views each partially showing the driving apparatus of FIG. 12.
Figure 13:
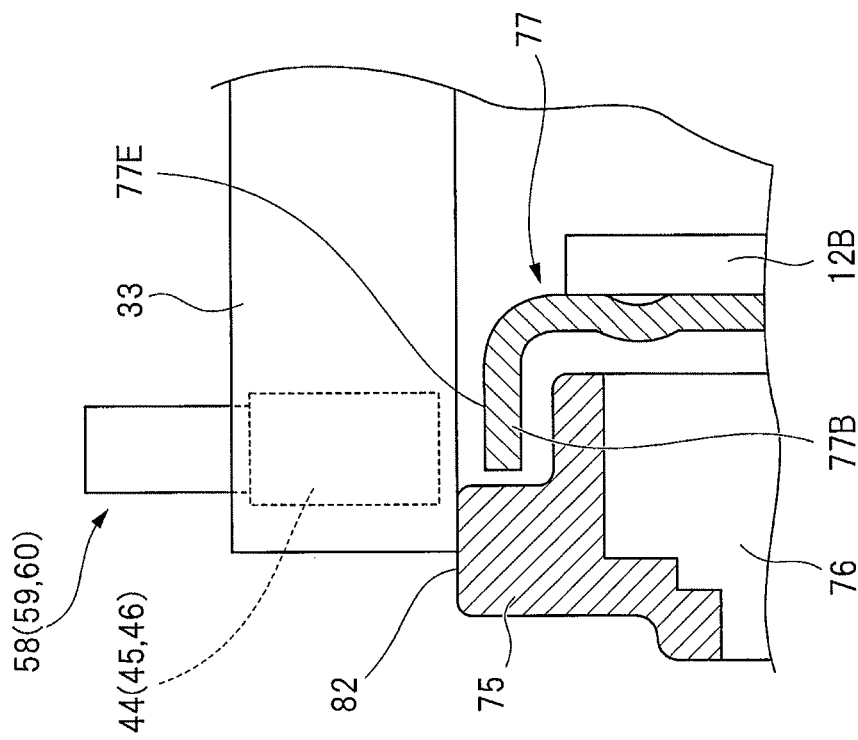

Furthermore, as shown in FIG. 13B, the surface 77E is disposed at a position closer to the protruding portion 33 than the seat surface of the mount 82 in the direction of the axis B1, the load of the protruding portion 33 is transmitted to the stopper 77, and the mount 82 receives no load. Additionally, when the tip end of the leg portion 77A of the stopper 77 is made in contact with the inner surface of the gear case 12, the load received by the stopper 77 is transmitted to the bottom of the gear case 12. On the other hand, when the tip end of the leg portion 77A of the stopper 77 is not made in contact with the bottom of the gear case 12, the load received by the stopper 77 is absorbed by frictional resistance between the stopper 77 and the wall portion 12B.

In contrast, as shown in FIG. 13A, in the direction of the axis B1, the seat surface of the mount 82 is disposed closer to the protruding portion 33 than the surface 77E, the load of the protruding portion 33 is transmitted to the mount 82, and the stopper 77 receives no load.

In this manner, the load to be received by the protruding portion 33 can be received by the mount 82 so that insertion amounts of the terminals 58, 59 and 60 into the terminals 44, 45 and 46 need not be managed in detail. Therefore, it is possible to easily carry out connection works between the terminals 58, 59, 60 and the terminals 44, 45, and 46.

The electric motor 16 described in the embodiment corresponds to "electric motor", the rotating shaft 27 corresponds to "rotating shaft", the axis B1 corresponds to "axis", the driving apparatus 10 corresponds to "driving apparatus", the stopper 77 corresponds to "positioning member", each of the terminals 44, 45, 46 correspond to "first terminals", and the terminal holder 31 corresponds to "terminal holder". The coil 88 corresponds to "coil", the stator 25 corresponds to "stator", the rotor 26 corresponds to "rotor", the gear case 12 corresponds to "gear case", the bearing 30 corresponds to "bearing", the worm 40 corresponds to "worm", the opening 12D corresponds to "opening", and the cover 13 corresponds to "cover".

The electric portions include a controller chip 53, capacitors 54 and 55, a inductor 56, an inverter chip 57 having a plurality of switching elements, terminals 58, 59 and 60, terminals 61 to 65, an earth terminal 66, and a magnetic sensor 68. The control board 49 corresponds to "control board", and each of the terminals 58, 59 and 60 correspond to "second terminals". At least, either one of the mount 82 and the plate portion 77B of the stopper 77 corresponds to "load receiving mechanism", and the mount 82 corresponds to "mount". Furthermore, the magnetic sensor 68 corresponds to "sensor", the electric motor 16 corresponds to "brushless motor", the worm wheel 41 corresponds to "worm wheel", and the output shaft 74 corresponds to "output shaft".

The present invention is not to be limited to the described embodiment. Alternations and/or modifications of the illustrated and/or described embodiments are contemplated as being alternative forms of the invention as far as they do not depart from the scope of the present invention, which is defined by the appended claims. Each number of the first and second terminals is not limited to three, and for example, two, four or more terminals are provided as each of the first and second terminals.

Furthermore, the electric motor is not limited by the brushless motor, and may include a motor with brushes. The motor with brushes is provided with a commutator fixed to the rotating shaft, a brush holder attached to the motor case, and brushes which are supported by the brush holder and made in contact with the commutator. In this case, the terminal holder is installed as an integral unit of the brush holder or a separated unit therefrom. The first terminals attached to the terminal holder are connected to the brushes. Furthermore, the driving apparatus includes a structure which allows the brushes to be made in contact with the commutator when the brush holder is attached to the gear case in assembling processes for the motor with brushes.

The layout region of the positioning member and the terminal holder includes meaning of the layout length in the axis direction or the layout range in the axis direction.

The driving apparatus can be used as a power source of an operating apparatus to be mounted on for example a vehicle, such as for example, a wiper apparatus for operating a wiper arm, a power window apparatus for operating a window incorporated in a door, a slide door apparatus for operating a slide door provided on either/both sides of the vehicle body.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A driving apparatus in which a position of a rotating shaft of an electric motor in an axis direction is determined, the driving apparatus comprising:
    a positioning member which determines a position of the rotating shaft in the axis direction;
    a terminal holder which holds a first terminal for supplying an electric current to the electric motor;
    a gear case in which the rotating shaft is housed;
    a bearing disposed inside the gear case, the bearing rotatably supporting the rotating shaft;
    a worm formed on the rotating shaft;
    a worm wheel rotatably disposed in the gear case, the worm wheel having a worm gear which is meshed with the worm;
    a cover which covers an opening of the gear case;
    a control board supported by the cover, the control board having installed thereon electric parts which control the electric motor; and
    a second terminal attached to the control board and connected to the first terminal,
    wherein a layout region of the positioning member in the axis direction and a layout region of the terminal holder in the axis direction are overlapped with each other,
    the positioning member is made in contact with the bearing and the gear case to determine the position of the rotating shaft in the axis direction,
    a load receiving mechanism is installed inside the gear case, and receives a load which is applied to the terminal holder when the first terminal and the second terminal are connected to each other, and
    the load receiving mechanism is the positioning member.

2. The driving apparatus according to claim 1, wherein the electric motor comprises:
    a stator having a coil connected to the first terminal; and
    a rotor attached to the rotating shaft, and forming a rotating magnetic field together with the stator.

3. The driving apparatus according to claim 1, wherein the load receiving mechanism is a mount which protrudes from an inner surface of the gear case.

4. The driving apparatus according to claim 1, wherein the second terminal protrudes in the axis direction from an edge of the control board, and
    a sensor for detecting a rotation phase of the rotating shaft is installed on the control board.

5. The driving apparatus according to claim 1, further comprising:
    an output shaft which is connected to a wiper arm, and rotated with the worm wheel.

6. The driving apparatus according to claim 1, wherein the electric motor is a brushless motor.

* * * * *